(12) United States Patent
Sakakibara et al.

(10) Patent No.: US 11,480,484 B2
(45) Date of Patent: Oct. 25, 2022

(54) AXIAL-FORCE MEASUREMENT METHOD, TIGHTENING DETERMINATION METHOD, AXIAL-FORCE MEASUREMENT APPARATUS, AND TIGHTENING DETERMINATION APPARATUS FOR BOLT

(71) Applicant: TOYOTA JIDOSHA KABUSHIKI KAISHA, Toyota (JP)

(72) Inventors: Masahito Sakakibara, Okazaki (JP); Yuichi Hirano, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 963 days.

(21) Appl. No.: 16/240,833

(22) Filed: Jan. 7, 2019

(65) Prior Publication Data
US 2019/0257706 A1  Aug. 22, 2019

(30) Foreign Application Priority Data
Feb. 22, 2018  (JP) .............................. JP2018-029835

(51) Int. Cl.
*G01L 5/00* (2006.01)
*G01L 5/24* (2006.01)
(Continued)

(52) U.S. Cl.
CPC .............. *G01L 5/24* (2013.01); *B25J 9/1633* (2013.01); *B25J 13/085* (2013.01);
(Continued)

(58) Field of Classification Search
CPC ....... G01L 5/02; G01L 5/0038; G01L 5/0042; G06T 7/66; G06T 7/0006;
(Continued)

(56) References Cited

U.S. PATENT DOCUMENTS 5,921,756 A * 7/1999 Matsuda ................. F04B 27/12
91/499
2005/0223804 A1 10/2005 Nakamura
(Continued)

FOREIGN PATENT DOCUMENTS

CN  1662797 A  8/2005
CN  105659060 A  6/2016
(Continued)

*Primary Examiner* — Max H Noori
(74) *Attorney, Agent, or Firm* — Oblon, McClelland, Maier & Neustadt, L.L.P.

(57) ABSTRACT

A method for measuring an axial-force of a bolt fastened to a component to be fastened, includes temporarily fastening the bolt to the component to be fastened with a temporarily-tightening torque, the temporarily-tightening torque being a torque which is determined in advance and by which a depression is formed on a head of the bolt, measuring a first axial force of the temporarily-fastened bolt, regularly fastening the bolt to the component to be fastened with a regularly-tightening torque, the regularly-tightening torque being torque which is determined in advance and larger than the temporarily-tightening torque, measuring a second axial force of the regularly-fastened bolt, and measuring an estimated axial force of the regularly-fastened bolt by using the torque with which the bolt is temporarily fastened, the torque with which the bolt is regularly fastened, and a difference between the first and second axial forces.

7 Claims, 10 Drawing Sheets

(51) Int. Cl.
*G06T 7/66* (2017.01)
*G06T 7/00* (2017.01)
*G01M 13/00* (2019.01)
*H01H 35/00* (2006.01)
*B25J 9/16* (2006.01)
*B25J 13/08* (2006.01)

(52) U.S. Cl.
CPC .......... *G01L 5/0038* (2013.01); *G01L 5/0042* (2013.01); *G01M 13/00* (2013.01); *G06T 7/0006* (2013.01); *G06T 7/66* (2017.01); *H01H 35/006* (2013.01); *G05B 2219/37344* (2013.01); *G05B 2219/45091* (2013.01); *G06T 2207/30164* (2013.01)

(58) Field of Classification Search
CPC .......... G06T 2207/30164; B25J 9/1633; B25J 13/085; G01M 13/00; H01H 35/00; G05B 2219/37344; G05B 2219/45091
See application file for complete search history.

(56) References Cited

U.S. PATENT DOCUMENTS

| | | | |
|---|---|---|---|
| 2008/0095595 A1* | 4/2008 | Maruyama | F16B 31/028 73/761 |
| 2014/0165795 A1* | 6/2014 | Kim | B25B 23/14 81/468 |
| 2016/0267645 A1 | 9/2016 | Nakamura et al. | |
| 2017/0138387 A1* | 5/2017 | Saigo | G01L 5/24 |
| 2018/0073542 A1* | 3/2018 | Saigo | H02J 50/12 |
| 2018/0165804 A1* | 6/2018 | Sakakibara | G01B 9/02 |

FOREIGN PATENT DOCUMENTS

| | | |
|---|---|---|
| JP | 2010-256230 A | 11/2010 |
| JP | 2015-81798 | 4/2015 |

\* cited by examiner

AXIAL-FORCE MEASUREMENT METHOD, TIGHTENING DETERMINATION METHOD, AXIAL-FORCE MEASUREMENT APPARATUS, AND TIGHTENING DETERMINATION APPARATUS FOR BOLT

CROSS REFERENCE TO RELATED APPLICATIONS

This application is based upon and claims the benefit of priority from Japanese patent application No. 2018-29835, filed on Feb. 22, 2018, the disclosure of which is incorporated herein in its entirety by reference.

BACKGROUND

The present disclosure relates to an axial-force measurement method, a tightening determination method, an axial-force measurement apparatus, and a tightening determination apparatus for a bolt. For example, the present disclosure relates to an axial-force measurement method, a tightening determination method, an axial-force measurement apparatus, and a tightening determination apparatus for a bolt fastened to a component to be fastened.

An axial force of a bolt fastened to a component to be fastened (i.e., a component to which the bolt is fastened) is often measured in order to, for example, check the fastened state of the bolt. The axial force of a bolt has a correlation with an amount of displacement of the head of the bolt (i.e., an amount of depression on the head of the bolt). Therefore, for example, in an axial-force measurement method disclosed in Japanese Unexamined Patent Application Publication No. 2015-081798, an axial force of a bolt is measured by measuring an amount of depression (hereinafter also referred to as a depression amount) on the head of the bolt before and after the bolt is fastened to a component to be fastened, and using the measured depression amounts and a correlation between axial forces of the bolt and depression amounts on the head of the bolt, which are acquired in advance.

SUMMARY

The present inventors have found the following problem. For example, because of manufacturing errors, there are individual differences among shapes of top surfaces of heads of bolts before the bolts are tightened. Therefore, even when bolts are tightened so that equal axial forces are generated, depression amounts on the heads of the bolts vary from one to another. Therefore, there is a possibility that axial forces of bolts cannot be accurately measured by the axial-force measurement method disclosed in Japanese Unexamined Patent Publication No. 2015-081798.

The present disclosure provides an axial-force measurement method, a tightening determination method, an axial-force measurement apparatus, and a tightening determination apparatus for a bolt, capable of accurately measuring an axial force of the bolt.

A first exemplary aspect is a method for measuring an axial-force of a bolt fastened to a component to be fastened, including:
temporarily fastening the bolt to the component to be fastened with a temporarily-tightening torque, the temporarily-tightening torque being a torque which is determined in advance and by which a depression is formed on a head of the bolt;
measuring a first axial force of the temporarily-fastened bolt;
regularly fastening the bolt to the component to be fastened with a regularly-tightening torque, the regularly-tightening torque being torque which is determined in advance and larger than the temporarily-tightening torque;
measuring a second axial force of the regularly-fastened bolt; and
measuring an estimated axial force of the regularly-fastened bolt by using the torque with which the bolt is temporarily fastened, the torque with which the bolt is regularly fastened, and a difference between the first and second axial forces.

The difference between the first and second axial forces can be calculated by using the first axial force as a base axial force and hence can be calculated while eliminating an individual difference in the shape of each bolt. Therefore, the axial force of the regularly-fastened bolt can be accurately measured.

In the above-described method for measuring the axial-force of the bolt,
the measuring of the first axial force preferably includes:
acquiring a first image representing a height distribution on the head of the temporarily-fastened bolt;
measuring a first depression amount on the head of the temporarily-fastened bolt by using the first image; and
measuring the first axial force by using the first depression amount and a predetermined correlation between axial forces of the bolt and depression amounts on the head of the bolt, and
the measuring of the second axial force preferably includes:
acquiring a second image representing a height distribution on the head of the regularly-fastened bolt;
measuring a second depression amount on the head of the regularly-fastened bolt by using the second image; and
measuring the second axial force by using the second depression amount and the predetermined correlation between axial forces of the bolt and depression amounts on the head of the bolt.

In the above-described method for measuring the axial-force of the bolt,
the bolt is preferably a bolt including a solid shaft, and
each of the first and second depression amounts is preferably a value that is obtained by subtracting an average value of a height distribution in a circular area centered on a center of gravity of the head of the bolt from an average value of a height distribution in a fringe part on the head of the bolt.

In the above-described method for measuring the axial-force of the bolt,
the bolt is preferably a bolt including a hollow shaft, and
each of the first and second depression amounts is preferably a value that is obtained by subtracting an average value of a height distribution in an annular area on the head of the bolt from an average value of a height distribution in a circular area on the head of the bolt, the circular area being centered on a center of gravity of the head of the bolt, the annular area surrounding the circular area and being located on an extended line of the shaft.

Another exemplary aspect is a method for determining tightening of a bolt fastened to a component to be fastened, including:
temporarily fastening the bolt to the component to be fastened with a temporarily-tightening torque, the temporarily-tightening torque being a torque which is determined in advance and by which a depression is formed on a head of the bolt;

measuring a first axial force of the temporarily-fastened bolt;

regularly fastening the bolt to the component to be fastened with a regularly-tightening torque, the regularly-tightening torque being torque which is determined in advance and larger than the temporarily-tightening torque;

measuring a second axial force of the regularly-fastened bolt;

measuring an estimated axial force of the regularly-fastened bolt by using the torque with which the bolt is temporarily fastened, the torque with which the bolt is regularly fastened, and a difference between the first and second axial forces; and determining that the regularly-fastened bolt is properly fastened to the component to be fastened when the estimated axial force of the regularly-fastened bolt is equal to or larger than a predetermined target axial force.

The difference between the first and second axial forces can be calculated by using the first axial force as a base axial force and hence can be calculated while eliminating an individual difference in the shape of each bolt. Therefore, it is possible to accurately measure the axial force of the regularly-fastened bolt and thereby to accurately determine whether or not the regularly-fastened bolt is properly fastened to the component to be fastened.

The above-described method for determining the tightening of the bolt preferably further includes:

loosening, after measuring the first axial force of the temporarily-fastened bolt, the bolt and measuring a torque required to loosen the bolt; and determining that the bolt is not properly fastened to the component to be fastened when the torque required to loosen the bolt is equal to or larger than a predetermined torque.

Since it is determined whether or not the bolt is properly fastened to the component to be fastened as described above, it is possible to prevent the bolt from being improperly fastened to the component to be fastened.

Another exemplary aspect is an axial-force measurement apparatus for a bolt fastened to a component to be fastened, including:

a fastening unit configured to fasten the bolt to the component to be fastened; and a measurement unit configured to measure an axial force of the bolt, in which the measurement unit is further configured to:

measure a first axial force of the bolt temporarily fastened to the component to be fastened with a temporarily-tightening torque, the temporarily-tightening torque being a torque which is determined in advance and by which a depression is formed on a head of the bolt;

measure a second axial force of the bolt regularly-fastened to the component to be fastened with a regularly-tightening torque, the regularly-tightening torque being torque which is determined in advance and larger than the temporarily-tightening torque; and measure an estimated axial force of the regularly-fastened bolt by using the torque with which the bolt is temporarily fastened, the torque with which the bolt is regularly fastened, and a difference between the first and second axial forces.

The difference between the first and second axial forces can be calculated by using the first axial force as a base axial force and hence can be calculated while eliminating an individual difference in the shape of each bolt. Therefore, the axial force of the regularly-fastened bolt can be accurately measured.

Another exemplary aspect is a tightening determination apparatus for a bolt fastened to a component to be fastened, including:

a fastening unit configured to fasten the bolt to the component to be fastened;

a measurement unit configured to measure an axial force of the bolt; and a determination unit configured to determine whether or not the bolt is properly fastened to the component to be fastened, in which the measurement unit is further configured to:

measure a first axial force of the bolt temporarily fastened to the component to be fastened with a temporarily-tightening torque, the temporarily-tightening torque being a torque which is determined in advance and by which a depression is formed on a head of the bolt;

measure a second axial force of the bolt regularly-fastened to the component to be fastened with a regularly-tightening torque, the regularly-tightening torque being torque which is determined in advance and larger than the temporarily-tightening torque; and measure an estimated axial force of the regularly-fastened bolt by using the torque with which the bolt is temporarily fastened, the torque with which the bolt is regularly fastened, and a difference between the first and second axial forces, and the determination unit is further configured to determine whether or not an estimated axial force of the regularly-fastened bolt is equal to or larger than a predetermined target axial force, and determine that the regularly-fastened bolt is properly fastened to the component to be fastened when the estimated axial force of the bolt is equal to or larger than the predetermined target axial force.

The difference between the first and second axial forces can be calculated by using the first axial force as a base axial force and hence can be calculated while eliminating an individual difference in the shape of each bolt. Therefore, it is possible to accurately measure the axial force of the regularly-fastened bolt and thereby to accurately determine whether or not the regularly-fastened bolt is properly fastened to the component to be fastened.

According to the present disclosure, it is possible to provide an axial-force measurement method, a tightening determination method, an axial-force measurement apparatus, and a tightening determination apparatus for a bolt, capable of accurately measuring an axial force of the bolt.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Embodiments according to the present disclosure are described hereinafter with reference to the drawings. However, the present disclosure is not limited to the below-shown embodiments. Further, the following descriptions and the drawings are simplified as appropriate to clarify the explanation.

First Embodiment

Figure 1:
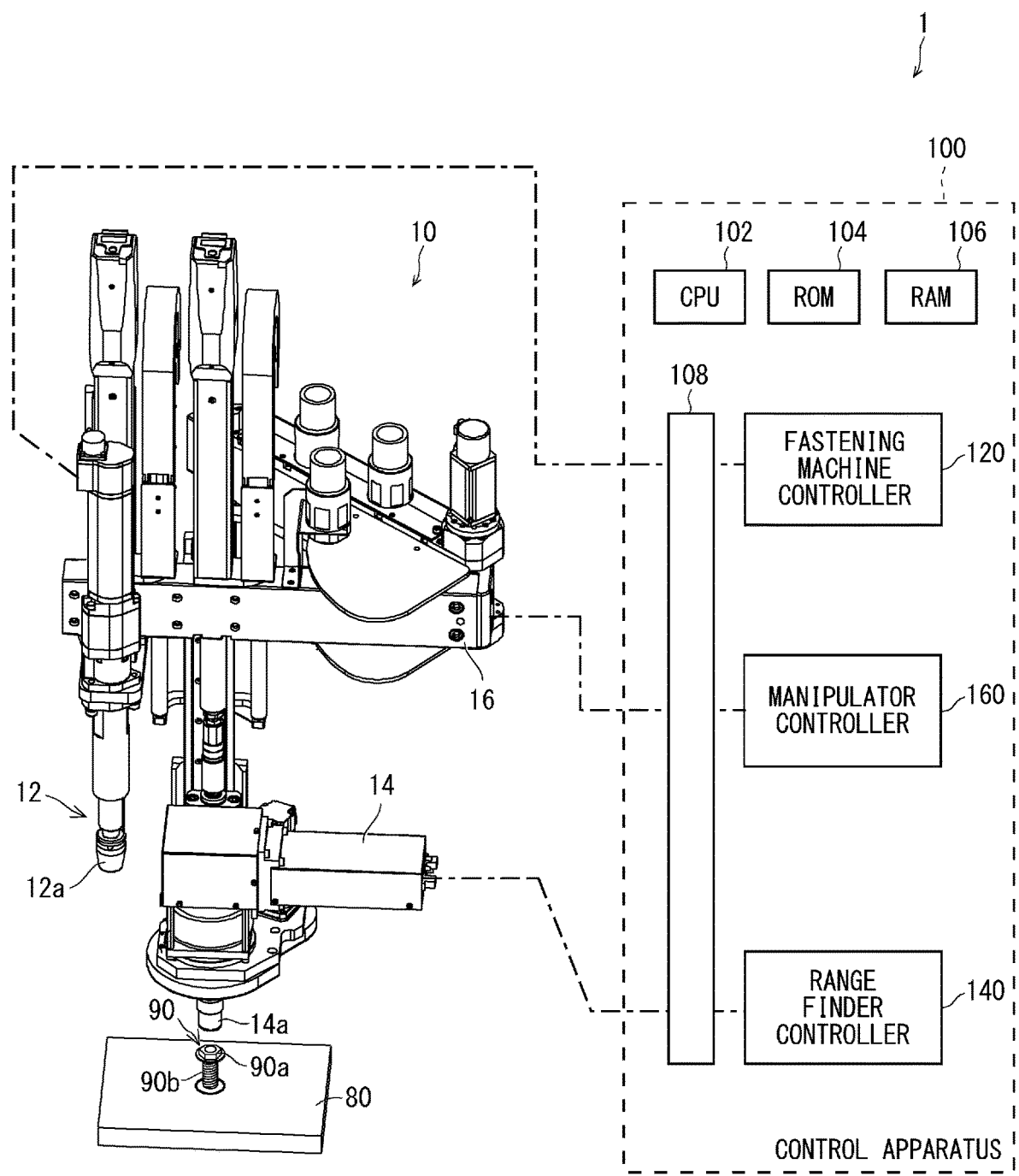
FIG. 1 shows a tightening determination apparatus for a bolt according to a first embodiment.

Firstly, a configuration of a tightening determination apparatus for a bolt according to this embodiment is described. FIG. 1 shows a tightening determination apparatus for a bolt according to this embodiment. A tightening determination apparatus 1 for a bolt (hereinafter also simply referred to as a tightening determination apparatus 1) includes a work robot 10 and a control apparatus 100. The work robot 10 operates under the control of the control apparatus 100. The work robot 10 includes a fastening machine (fastening unit) 12, a range finder 14, and a manipulator 16.

The fastening machine 12 is, for example, a nut runner. The fastening machine 12 includes a socket part 12a at its tip in order to fasten (i.e., screw) a bolt 90 to a component to be fastened 80 (hereinafter, also simply referred to as a fastened component 80). The fastened component 80 is a component with a threaded hole into which the bolt 90 is fastened (i.e., screwed), and may include a nut or the like.

The bolt 90 is a fastening component such as a solid or hollow hexagonal-head bolt or a hexagonal socket-head bolt. Therefore, the shape of the socket part 12a can be changed as appropriate according to the shape of a head 90a of the bolt 90. In this embodiment, an example case in which as an example of the bolt 90, a hexagonal-head bolt including a solid shaft 90b is fastened to (i.e., screwed into) a fastened component 80 is explained.

The range finder 14 is, for example, a range sensor or a 3D (three-dimensional) camera. The range finder 14 measures distances to the head 90a of the bolt 90 fastened to the fastened component 80 and thereby acquires data representing a range image in which pixel values indicate measured distances (hereinafter, also simply referred to as a range image). That is, the range finder 14 acquires data representing an image representing a height distribution on the head 90a of the bolt 90.

The manipulator 16 operates (e.g., moves) the fastening machine 12 and the range finder 14. For example, the manipulator 16 moves the fastening machine 12 so that the socket part 12a of the fastening machine 12 is opposed to the head 90a of the bolt 90. Further, the manipulator 16 moves the range finder 14 so that an image pickup element 14a of the range finder 14 is opposed to the head 90a of the bolt 90.

The control apparatus 100 is, for example, a computer. The control apparatus 100 includes, as principal hardware components, a CPU (Central Processing Unit) 102, a ROM (Read Only Memory) 104, a RAM (Random Access Memory) 106, and an interface unit 108 (IF; Interface). The CPU 102, the ROM 104, the RAM 106, and the interface unit 108 are connected with each other through a data bus or the like.

The CPU 102 has functions as an arithmetic apparatus that performs control processes, arithmetic processes, etc. The ROM 104 has a function of storing a control program (s), an arithmetic program(s), etc. that are executed by the CPU 102. The RAM 106 has a function of temporarily storing processing data and the like. The interface unit 108 externally receives/outputs signals wirelessly or through a wire.

The control apparatus 100 includes a fastening machine controller 120, a range finder controller 140 and a manipulator controller 160. The fastening machine controller 120 controls the fastening machine 12.

The range finder controller 140 calculates a depression amount on the head 90a of the bolt 90 by using the range image and thereby measures (calculates) an estimated axial force of the bolt 90 fastened to the fastened component 80. Then, the range finder controller 140 determines whether or not the measured estimated axial force of the bolt 90 is equal to or larger than a predetermined target axial force, and determines whether or not the bolt 90 is properly fastened to the fastened component 80 based on the determination result about the axial force. That is, the range finder controller 140 has functions as a measurement unit and a determination unit.

The manipulator controller 160 controls the movements of the fastening machine 12 and the range finder 14 by controlling the manipulator 16.

Note that since the control apparatus 100 according to this embodiment is used for the tightening determination apparatus 1, the range finder controller 140 determines whether or not the measured estimated axial force of the bolt 90 is equal to or larger than the predetermined target axial force and determines whether or not the bolt 90 is properly fastened to the fastened component 80 based on the determination result about the axial force. However, when the control apparatus 100 is used for an axial-force measurement apparatus, the control apparatus 100 does not necessarily have to have the above-described determination function.

The above-described fastening machine controller 120, the range finder controller 140, and the manipulator controller 160 can be implemented by, for example, having the CPU 102 execute a program(s) stored in the ROM 104. Alternatively, the fastening machine controller 120, the range finder controller 140, and the manipulator controller 160 may be implemented by storing necessary programs in advance in an arbitrary nonvolatile recording medium and installing them as required.

Note that the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Note that the implementation of the fastening machine controller 120, the range finder controller 140, and the manipulator controller 160 is not limited to the above-described software implementation and may be implemented by hardware such as some type of circuit devices.

Further, the fastening machine controller 120, the range finder controller 140, and the manipulator controller 160 do not necessarily have to be disposed in one physical apparatus and may instead be formed as separate hardware components. In such a case, each of the fastening machine controller 120, the range finder controller 140, and the manipulator controller 160 may function as a computer.

The control apparatus 100 stores teaching data by which the work robot 10 performs a series of operation processes. As shown in the later-described FIG. 2, the teaching data is data for performing a series of operation processes such as fastening the bolt 90 to the fastened component 80 and acquiring a range image of the head 90a of the bolt 90. The fastening machine controller 120, the range finder controller 140, and the manipulator controller 160 control the fastening machine 12, the range finder 14, and the manipulator 16, respectively, in accordance with the above-described teaching data.

Figure 2:
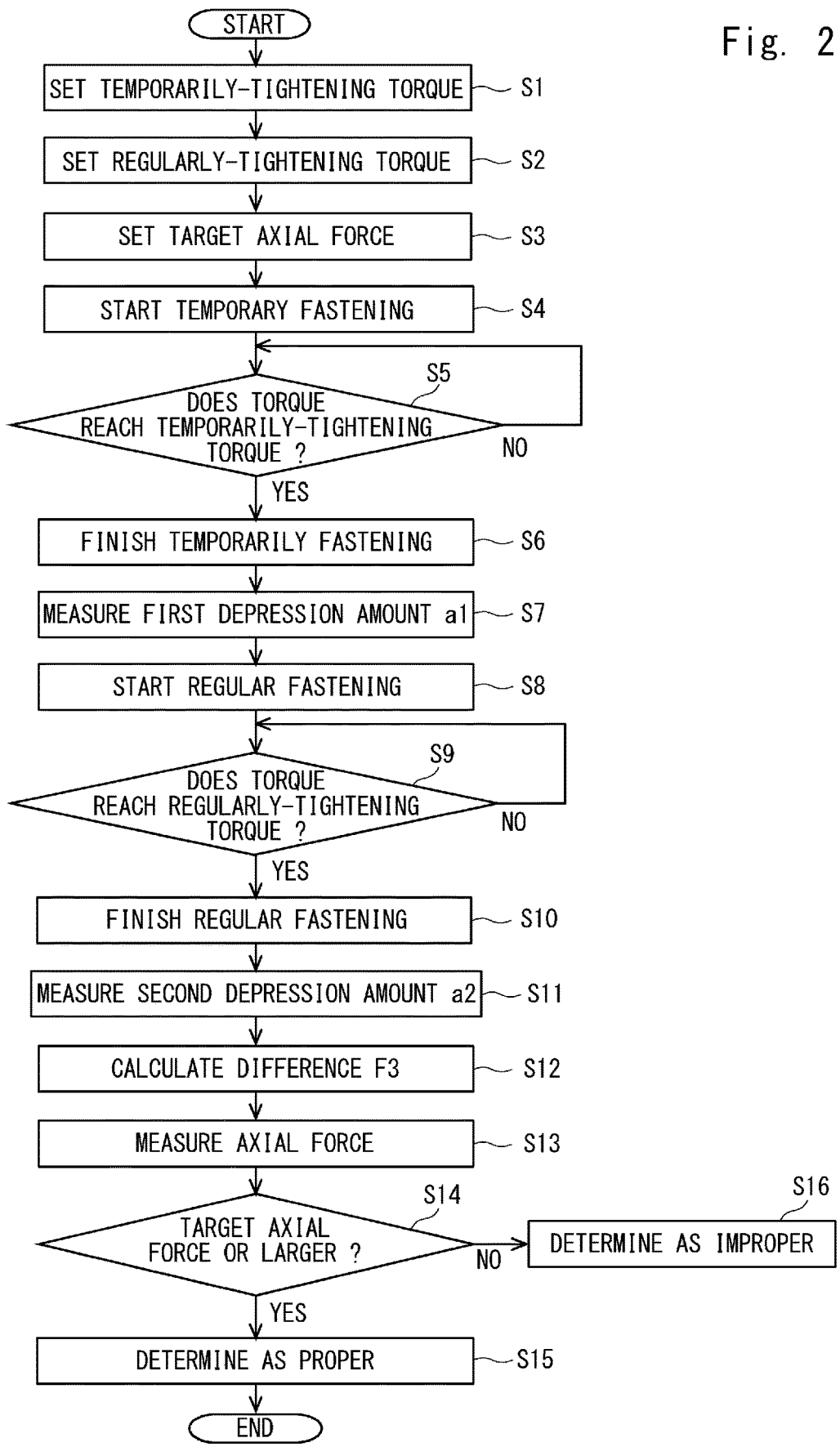
FIG. 2 is a flowchart showing a method for determining tightening of a bolt according to the first embodiment.

Next, a method for determining tightening of a bolt 90 according to this embodiment is described. FIG. 2 is a flowchart showing a method for determining tightening of a bolt according to this embodiment.

Firstly, the control apparatus 100 sets a temporarily-tightening torque (seating torque) (S1). The temporarily-tightening torque is set to a torque (e.g., 30 Nm) by which the head 90a of the bolt 90 is seated on the fastened component 80 and a depression is formed on the head 90a of the bolt 90. Note that when the bolt 90 is seated on the fastened component 80, the entire area on the surface of the head 90a of the bolt 90 on the side of the fastened component 80 does not necessarily have to be in surface-contact with the fastened component 80.

Next, the control apparatus 100 seta a regularly-tightening torque (target torque) (S2) and sets a target axial force (S3). The regularly-tightening torque is larger than the temporarily-tightening torque and is set to a torque (e.g., 100 Nm) by which the bolt 90 is expected to generate the target axial force when the bolt 90 is fastened to the fastened component 80. The target axial force is set to an axial force that is desired to be generated in the bolt 80 in a state where the bolt 90 is fastened to the fastened component 80.

Note that the order of the processes in the steps S1 to S3 can be changed. That is, the only requirement is that each of the temporarily-tightening torque, the regularly-tightening torque, and the target axial force be set before its setting value is used. For example, the temporarily-tightening torque, the regularly-tightening torque, and the target axial force can be entered by an operator (e.g., a worker) by using an input device.

Next, the tightening determination apparatus 1 starts temporary fastening of the bolts 90 (S4). Specifically, in response to a command signal that is entered by pressing a button provided in the control apparatus 100 or the like, or by an operator operating an input device, the manipulator controller 160 of the control apparatus 100 moves the fastening machine 12 in accordance with teaching data so that the fastening machine 12 is opposed to the head 90a of the bolt 90 and lowers the socket part 12a so that the head 90a is inserted into the socket part 12a.

When the bolt 90 is set in the state where the head 90a is inserted into the socket part 12a of the fastening machine 12, the manipulator controller 160 outputs a setting completion signal to the fastening machine controller 120. Upon receiving the set completion signal, the fastening machine controller 120 controls the fastening machine 12 and thereby fastens the bolt 90 to the fastened component 80 with the set temporarily-tightening torque. As a result, an axial force is generated in the bolt 90 and hence the bolt 90 is deformed so that the top surface of the head 90a is depressed.

When the tightening torque reaches the temporarily-tightening torque (Yes at S5), the fastening machine controller 120 stops the fastening machine 12 and thereby finishes the temporarily-fastening operation (S6). Then, the fastening machine controller 120 outputs a temporarily-fastening completion signal indicating that the temporarily-fastening operation has been finished to the manipulator controller 160. On the other hand, when the tightening torque is smaller than the temporarily-tightening torque (No at S5), the fastening machine controller 120 continues the tightening of the bolt 90 by the fastening machine 12.

Next, the tightening determination apparatus 1 measures a first depression amount a1 on the head 90a of the bolt 90 by using the range finder 14 (S7). Specifically, when the temporarily-fastening completion signal is input to the manipulator controller 160, it retracts the fastening machine 12 from the position where the fastening machine 12 is opposed to the head 90a of the bolt 90. Then, the manipulator controller 160 controls the manipulator 16 so that the image pickup element 14a of the range finder 14 is opposed to the head 90a of the bolt 90.

When the image pickup element 14a of the range finder 14 is set so as to be opposed to the head 90a of the bolt 90, the manipulator controller 160 outputs a setting completion signal to the range finder controller 140. Upon receiving the set completion signal, the range finder controller 140 controls the range finder 14 so that the range finder 14 generates a range image (a first image) of the head 90a of the temporarily-fastened bolt 90, and thereby acquires the first image. Then, upon acquiring the first image, the range finder controller 140 measures a first depression amount a1 on the head 90a of the temporarily-fastened bolt 90. Note that details of the procedure for acquiring the range image and the procedure for measuring the depression amount will be described later.

Next, the tightening determination apparatus 1 starts regular fastening of the bolts 90 (S8). Specifically, when the range finder controller 140 measures a first depression amount a1, it outputs a measurement completion signal to the manipulator controller 160. Upon receiving the measurement completion signal, the manipulator controller 160 retracts the range finder 14 from the position where the range finder 14 is opposed to the head 90*a* of the bolt 90. Then, the manipulator controller 160 controls the manipulator 16 so that the manipulator 16 moves the socket part 12*a* of the fastening machine 12 so that the socket part 12*a* is opposed to the head portion 90*a* of the bolt 90, and lowers the socket part 12*a* so that the head 90*a* is inserted into the socket part 12*a*.

When the bolt 90 is set in the state where its head 90*a* is inserted into the socket part 12*a* of the fastening machine 12, the manipulator controller 160 outputs a setting completion signal to the fastening machine controller 120. Then, upon receiving the set completion signal, the fastening machine controller 120 controls the fastening machine 12 and thereby tightens the bolt 90 with the set regularly-tightening torque.

When the tightening torque reaches the regularly-tightening torque (Yes at S9), the fastening machine controller 120 stops the fastening machine 12 and thereby finishes the regularly-fastening operation (S10) Then, the fastening machine controller 120 outputs a regularly-fastening completion signal indicating that the regularly-fastening operation has been finished to the manipulator controller 160. On the other hand, when the tightening torque is smaller than the regularly-tightening torque (No at S9), the fastening machine controller 120 continues the tightening of the bolt 90 by the fastening machine 12.

Next, the tightening determination apparatus 1 measures a second depression amount a2 on the head 90*a* of the regularly-fastened bolt 90 by using the range finder 14 (S11). Specifically, when the regularly-fastening completion signal is input to the manipulator controller 160, it retracts the fastening machine 12 from the position where the fastening machine 12 is opposed to the head 90*a* of the bolt 90. Then, the manipulator controller 160 controls the manipulator 16 so that the image pickup element 14*a* of the range finder 14 is opposed to the head 90*a* of the bolt 90. When the range finder 14 is set over the head 90*a* of the bolt 90, the manipulator controller 160 outputs a set completion signal to the range finder controller 140.

Similarly to the first image, upon receiving the set completion signal, the range finder controller 140 acquires a range image (a second image) of the head 90*a* of the regularly-fastened bolt 90. Further, similarly to the first depression amount a1, the range finder controller 140 measures a second depression amount a2 on the head 90*a* of the regularly-fastened bolt 90 by using the second image.

Next, the range finder controller 140 measures an axial force (first axial force) F1 of the temporarily-fastened bolt 90 by using the first depression amount a1, measures an axial force (second axial force) F2 of the regularly-fastened bolt 90 by using the second depression amount a2, and calculates a difference F3 between the first and second axial forces F1 and F2 (S12). Specifically, the range finder controller 140 calculates each of the axial forces F1 and F2, and the difference F3 by using the first depression amount a1, the second depression amount a2, and an axial-force conversion curve or a conversion formula etc. corresponding to the axial-force conversion curve.

Figure 3:
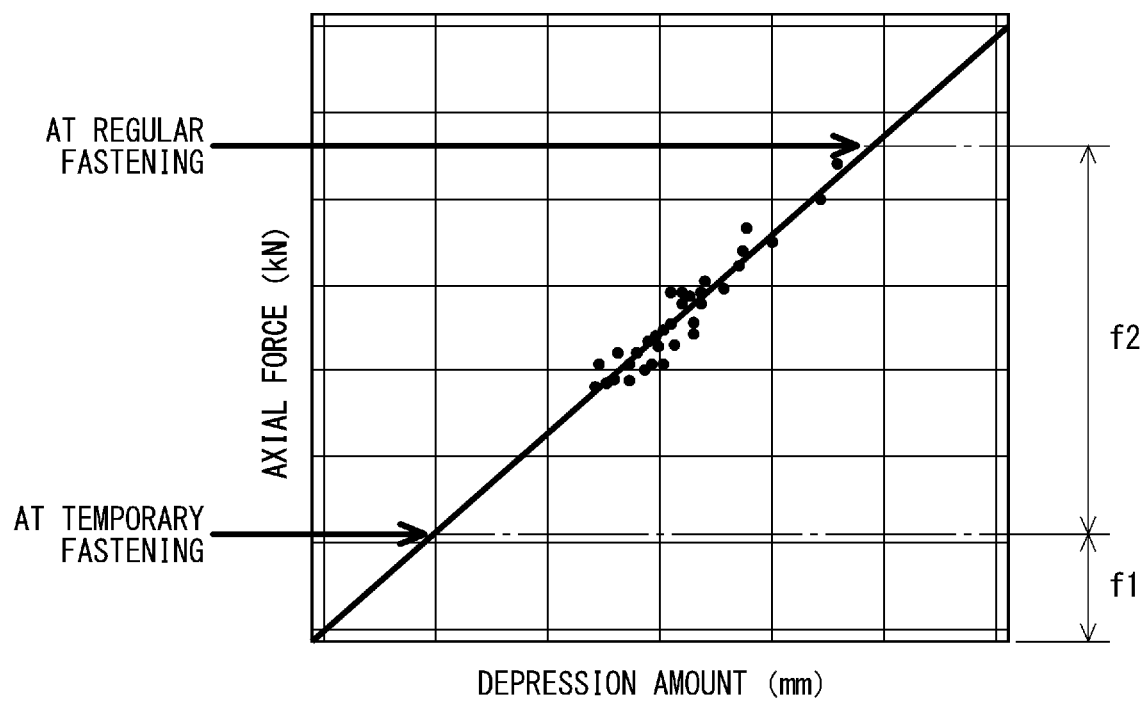
FIG. 3 is a graph showing an axial-force conversion curve.

FIG. 3 is a graph showing an axial-force conversion curve. The axial-force conversion curve is a curve in a graph in which a horizontal axis represents depression amounts and a vertical axis represents axial forces. The control apparatus 100 stores this axial-force conversion curve. Note that the axial-force conversion curve can be created by, for example, the following method.

Axial forces in states where bolts of the same standards are tightened with various tightening torques are measured in advance by using a tensile tester, a load cell, etc. Further, depression amounts of heads of the bolts in these states are calculated by using a range finder. Then, a plurality of points indicating depression amounts and axial forces are plotted, and an approximating curve (or an approximating straight line) of these points is defined as an axial-force conversion curve. Therefore, the axial-force conversion curve may be a straight line. That is, the term "curve" in this specification is a concept that includes a straight line. Note that the control apparatus 100 can store a plurality of different axial-force conversion curves for various types of bolts 90.

By using the above-described axial force conversion curve, the range finder controller 140 can derive the first axial force F1 by using the first depression amount a1 and derive the second axial force F2 by using the second depression amount a2. Then, the range finder controller 140 can calculate the difference F3 by subtracting the derived first axial force F1 from the derived second axial force F2.

Note that since the axial force conversion curve in this embodiment is a straight line as shown in FIG. 3, the difference F3 may be calculated by using a value obtained by subtracting the first depression amount a1 from the second depression amount a2 and the axial-force conversion curve without deriving the first and second axial forces F1 and F2.

Next, the range finder controller 140 measures an estimated axial force of the regularly-fastened bolt 90 by using a first torque T1 with which the bolt 90 is temporarily fastened, a second torque T2 with which the bolt 90 is regularly fastened, and the difference F3 (S13).

The first torque T1 with which the bolt 90 is temporarily fastened may be either a predetermined temporarily-tightening torque or a torque that is measured by a torque sensor provided in the fastening machine 12 when the bolt 90 is temporarily fastened. Further, the second torque T2 with which the bolt 90 is regularly fastened may be either a predetermined regularly-tightening torque or a torque that is measured by the torque sensor provided in the fastening machine 12 when the bolt 90 is regularly fastened.

Here, the torque which the bolt 90 is temporarily fastened is represented by t1; the torque which the bolt 90 is regularly fastened is represented by t2; the axial force of the temporarily-fastened bolt is represented by f1; a difference between the axial force of the regularly-fastened bolt and that of the temporarily-fastened bolt is represented by f2, and a friction coefficient of the bolt is represented by μ. Then, the torque t1 can be derived by the below-shown <Expression 1>.

$$t1 = \mu \times f1 \qquad \text{<Expression 1>}$$

Further, the torque t2 can be derived by the below-shown <Expression 2>.

$$t2 = \mu \times f2 + t1 \qquad \text{<Expression 2>}$$

Further, the below-shown <Expression 3> can be derived from the above-show <Expression 1> and <Expression 2>.

$$t2 = \mu \times (f1 + f2) \qquad \text{<Expression 3>}$$

By modifying <Expression 3> into "μ=t2/(f1+f2)", substituting it into <Expression 2>, and modifying the obtained expression, the below-shown <Expression 4> can be derived.

$$t2 - t1 = f2 \times t2/(f1 + f2) \qquad \text{<Expression 4>}$$

By further modifying <Expression 4>, the below-shown <Expression 5> can be derived.

$$f1 + f2 = f2 \times t2/(t2 - t1) \qquad \text{<Expression 5>}$$

The value "f1+f2" calculated by <Expression 5> is an estimate axial force of the regularly-fastened bolt. In this way, it is possible to measure the estimated axial force of the bolt 90 regularly fastened to the fastened component 80 by using the first torque T1, the second torque T2, and the difference F3.

Note that since the first and second torques T1 and T2 have predetermined values or values measured by the torque sensor, they can be easily derived. Further, the difference F3 can also be easily derived by using the depression amount and the axial-force conversion curve. Further, the difference F3 has a value in which an individual difference in the first depression amount a1 on the head 90a of each bolt 90 is eliminated. Therefore, the axial force of the regularly-fastened bolt 90 can be accurately measured.

Next, the range finder controller 140 determines whether or not the estimated axial force of the bolt 90 is equal to or larger than the target axial force (S14). When the estimated axial force of the bolt 90 is equal to or larger than the target axial force (Yes at S14), the range finder controller 140 determines that the bolt 90 is properly fastened to the fastened component 80 (S15). On the other hand, when the estimated axial force of the bolt 90 is smaller than the target axial force (No at S14), the range finder controller 140 determines that the bolt 90 is not properly fastened to the fastened component 80 (S16). With the above-described determination, the tightening determination method for the bolt 90 according to this embodiment is finished.

Note that although the tightening determination method according to this embodiment includes the processes in the steps S14 to S16, the processes in the steps S14 to S16 can be skipped in an axial-force measurement method for a bolt 90. That is, the axial-force measurement method for the bolt 90 is carried out within the tightening determination method according to this embodiment.

Figure 4:
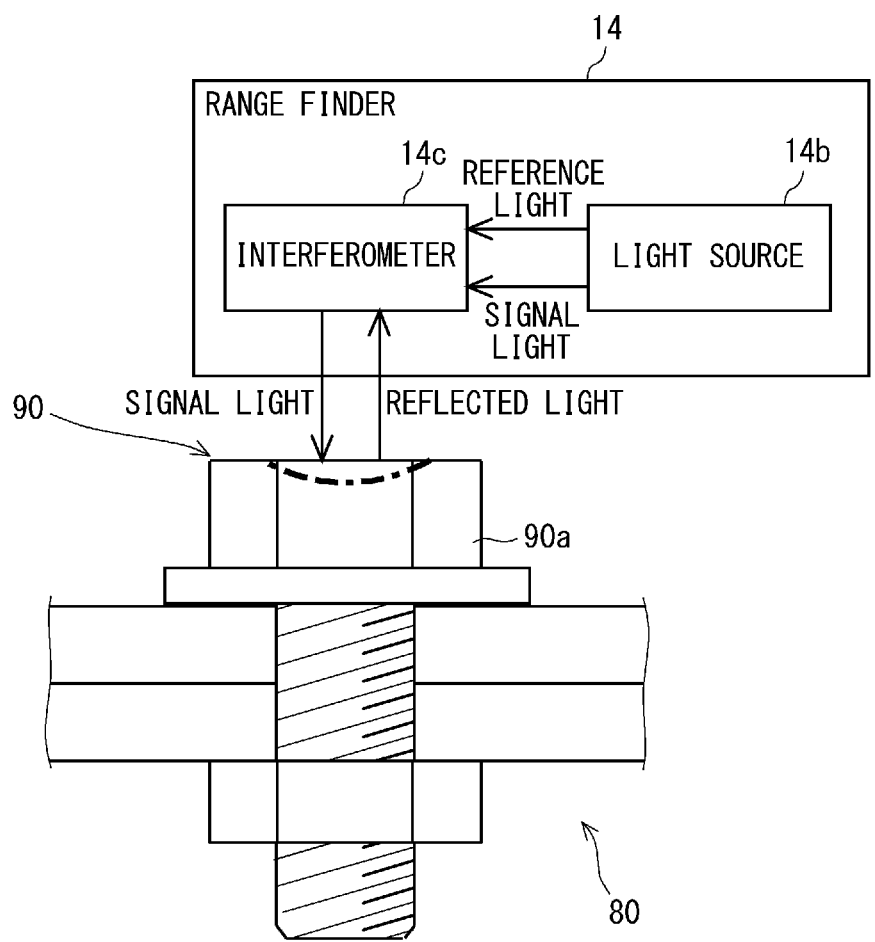
FIG. 4 shows a state in which a range image is acquired by using a range finder according to the first embodiment.

Next, a procedure for acquiring a range image by using the range finder 14 according to this embodiment is described. FIG. 4 shows a state in which a range image is acquired by using a range finder according to this embodiment. Note that in FIG. 4, a depression on the head 90a of the bolt 90 is indicated by an alternate long and short dash line.

As shown in FIG. 4, the range finder 14 includes, for example, a light source 14b and an interferometer 14c. For example, the light source 14b supplies reference light and signal light, which are laser light, to the interferometer 14c. The interferometer 14c applies the signal light to the top surface of the head 90a of the bolt 90.

The interferometer 14c receives reflected light of the signal light, i.e., the signal light that has been reflected on the top surface of the head 90a. Further, the interferometer 14c acquires, as a base signal, a signal that is obtained by making the signal light that is not applied to the top surface of the head 90a of the bolt 90 and the reference light interfere with each other. The interferometer 14c acquires a signal that is obtained by making the reflected light and the reference light interfere with each other as a measurement signal.

Then, the range finder 14 measures a distance to a place on the head 90a of the bolt 90 to which the signal light is applied by using a difference (a phase difference, a time difference, etc.) between the base signal and the measurement signal. Further, the range finder 14 can measure a distance to each place on the top surface of the head 90a of the bolt 90 by having the interferometer 14c scan the signal light (i.e., successively move the irradiated point of the signal light) on the top surface of the head 90a of the bolt 90 by using a galvano-mirror or the like.

The range finder 14 generates a range image in which each pixel corresponds to a respective point on the top surface and its pixel value indicates a distance to the respective point, and outputs the generated range image to the range finder controller 140. In this way, the range finder controller 140 can acquire the range image of the head 90a of the bolt 90.

Note that pixel values in the range image may be defined so that the longer the distance to the range finder 14 is, the larger the pixel value becomes, or the longer the distance to the range finder 14 is, the smaller the pixel value becomes. In the case where larger pixel values indicate longer distances to the range finder 14, pixels having large pixel values indicate places having low heights on the head 90a of the bolt 90. On the other hand, in the case where smaller pixel values indicate longer distances to the range finder 14, pixels having large pixel values indicate places having high heights on the head 90a of the bolt 90. That is, a pixel value of a pixel indicates a distance from the range finder 14 to a place corresponding to that pixel and can indicate a height of that place.

Note that the range finder 14 shown in FIG. 4 is one using an optical comb method. However, the range finder 14 is not limited to such methods and may be one using a shadow moire method or the like. Further, the interferometer 14c may be integrally formed with the image pickup element 14a. Further, the range finder controller 140 may generate a range image based on distance data in each place on the top surface of the head 90a of the bolt 90.

Next, a procedure for calculating a depression amount on the head 90a of the bolt 90 by using a range image is described. A depression amount is measured by calculating a difference between a distance to the bottom (valley) on the top surface of the head 90a of the bolt 90 and a distance to the top (mountain) on the top surface from a range image. That is, the depression amount is a value that is obtained by subtracting the height of the bottom (valley) on the top surface of the head 90a of the bolt 90 from the height of the top (mountain) on the top surface. Note that since the bolt 90 according to this embodiment is a hexagonal-head bolt, there is little depression on the top surface of the head portion 90a and hence the depression amount is roughly zero before the bolt 90 is tightened. However, in the case where the bolt 90 is a bolt in which a central part on the top surface of the head 90a protrudes, the depression amount can have a negative value.

Figure 5:
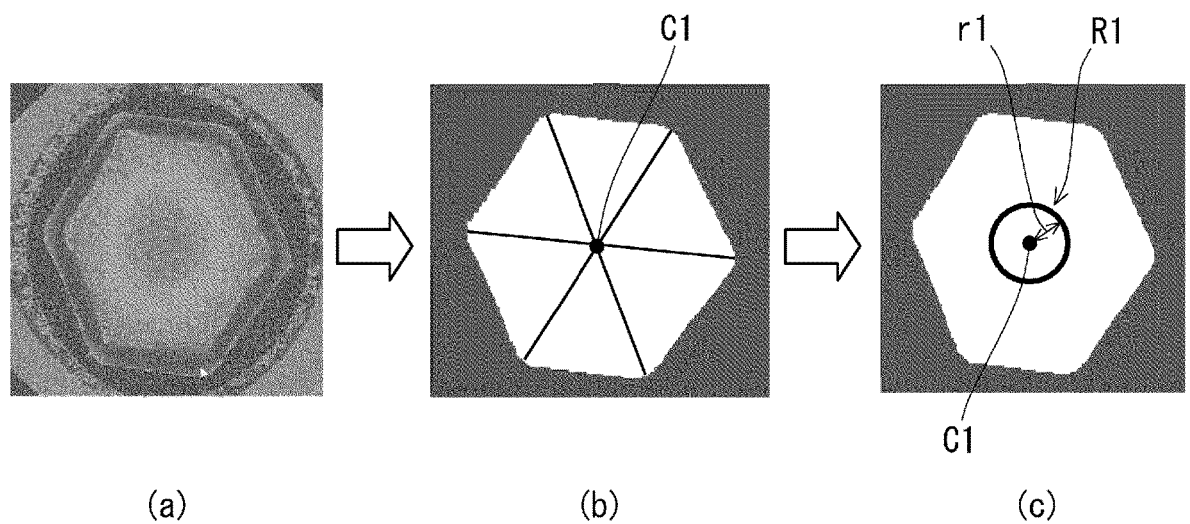
FIG. 5 is a drawing for explaining a procedure for calculating a height of a bottom on a head of a bolt by using a range image.

FIG. 5 is a drawing for explaining a procedure for calculating a height of a bottom on a head of a bolt by using a range image. FIG. 5 (a) shows an original image of a range image corresponding to the head 90a of the bolt 90. The range finder controller 140 performs binarization processing, labeling processing, etc. for the range image shown in FIG. 5 (a) and thereby extracts the head 90a of the bolt 90 as shown in FIG. 5 (b).

The binarization processing is performed by classifying each pixel value in the range image into one of two colors (e.g., black or white) depending on whether or not the pixel value is equal to or larger than a predetermined threshold. In the example shown in FIG. 5 (b), when a pixel value indicates that a height is higher than a predetermined threshold (i.e., indicates that a distance from the range finder 14 is shorter than a predetermined threshold), the pixel is classified as white. Further, if not so, the pixel is classified as black.

The labeling processing is processing in which the same number is assigned to consecutive pixels having the same pixel value and pixels are divided into different colors according to the assigned number. By this labeling processing, it is possible to prevent noises that lead to a higher measurement result (i.e., closer to the range finder 14) than the actual height due to dust or the like from being erroneously recognized as a part of the bolt 90. By the above-described processing, the range finder controller 140 can recognize white parts shown in FIG. 5 (b) as the head 90a of the bolt 90.

Then, the range finder controller 140 connects opposed vertices in the hexagon by line segments and calculates the intersection of these line segments as the center of gravity C1 of the head 90a of the bolt 90 in the image of the head 90a shown in FIG. 5(b). Note that all the vertices do not necessarily have to be connected by three line segments. That is, the intersection of two line segments may be defined as the center of gravity C1. Further, when the three line segments do not intersect at one point, the center of gravity of a triangle that is formed by using the three intersections as its vertices may be defined as the center of gravity C1.

Next, the range finder controller 140 defines an average value of pixel values of pixels in a circular area R1 that is centered on the center of gravity C1 and has a radius r1 as a distance to the bottom (valley) on the head 90a of the bolt 90, i.e., as a height h1 of the bottom. The radius r1 is, for example, 2.5 mm, but is not limited this value. The radius r1 can be determined as appropriate according to the size and shape of the head 90a of the bolt 90 (such as a size of a concave part such as a hexagonal socket part already formed in the head 90a).

Figure 6:
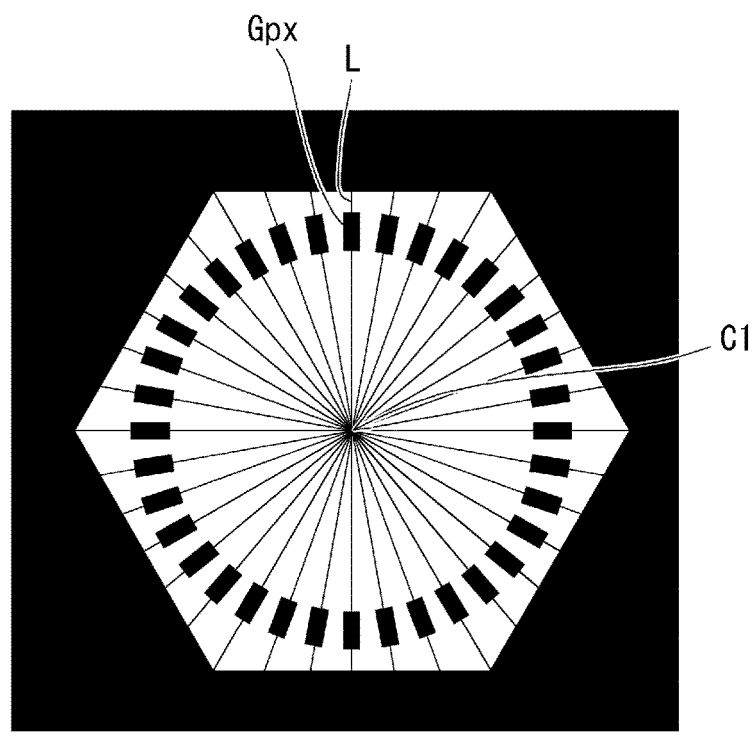
FIG. 6 is a drawing for explaining a procedure for calculating a height of a top of a head of a bolt by using a range image.

FIG. 6 is a drawing for explaining a procedure for calculating a height of a top of a head of a bolt by using a range image. The range finder controller 140 extracts (i.e., selects) a predetermined number of pixels (e.g., ten pixels) that corresponds to places whose heights are relatively high among pixels that are positioned on each of a plurality of imaginary straight lines L radially extending from the center of gravity C1 at intervals of constant angles (e.g., 0.5°).

For example, in the case where smaller pixel values indicate longer distances to the range finder 14, the range finder controller 140 extracts (i.e., selects) ten pixels having relatively large pixel values. Further, in the case where larger pixel values indicate longer distances to the range finder 14, the range finder controller 140 extracts (i.e., selects) ten pixels having relatively small pixel values.

Then, the range finder controller 140 defines an average value of the extracted pixels (7,200 pixels (720×10=7,200) in the above-described example) as a distance to the top (mountain) on the head 90a of the bolt 90, i.e., as a height h2 of the top. In this way, the range finder controller 140 can calculate a value that is obtained by subtracting the height h1 of the bottom from the height h2 of the top as a depression amount.

In general, the area deformed by the axial force is the central part of the head 90a, i.e., an area at or around the center of gravity C1 of the head 90a of the bolt 90. In contrast, an area in or near the fringe (a fringe part) of the head 90a of the bolt 90 is hardly deformed by the axial force. Therefore, this means that the top of the head 90a of the bolt 90 is located in or near the fringe of the head 90a. Further, the actual height of the top of the head 90a of the bolt 90 does not change. Further, pixels having pixel values indicating high heights (i.e., pixels corresponding to the top) among the pixels positioned on each imaginary straight lines L may be adjacent to each other in a place in the range image that correspond to the area in or near the fringe of the head 90a of the bolt 90.

A pixel group Gpx shown in FIG. 6 indicates a group of ten pixels having pixel values indicating ten highest heights among the pixels positioned on each imaginary straight lines L. Further, in the pixel group Gpx, the ten pixels having pixel values indicating the ten highest heights are adjacent to each other. Further, though depending on the shape of the head 90a of the bolt 90, a set of pixels corresponding to the top of the head 90a of the bolt 90 forms roughly an annular shape along the fringe of the head 90a.

In the above-described axial-force measurement method, the tightening determination method, the axial-force measurement apparatus, and the tightening determination apparatus 1 for the bolt 90, the axial force of the bolt 90 regularly fastened to the fastened component 80 is measured by using the first torque T1, the second torque T2, and the difference F3. Note that the difference F3 can be calculated by using the first depression amount a1 as a base amount and hence can be calculated while eliminating an individual difference in the shape of the top surface of the head 90a of each bolt 90. Therefore, the axial force of the regularly-fastened bolt 90 can be accurately measured. As a result, the tightening determination method using the axial-force measurement method for the bolt 90 and the tightening determination apparatus 1 using the axial-force measurement apparatus of the bolt 90 according to this embodiment can accurately determine whether or not the regularly-fastened bolt 90 is properly fastened to the fastened component 80.

Second Embodiment

A tightening determination apparatus according to this embodiment is configured so as to be able to determine whether or not a bolt 90 is properly fastened to a fastened component 80. The tightening determination apparatus according to this embodiment will be described hereinafter together with a tightening determination method. Note that the tightening determination apparatus and the tightening determination method according to this embodiment are roughly the same as the tightening determination apparatus and the tightening determination method according to the first embodiment. Therefore, duplicate descriptions are omitted and the same symbols are assigned to the same components/structures.

Figure 7A:
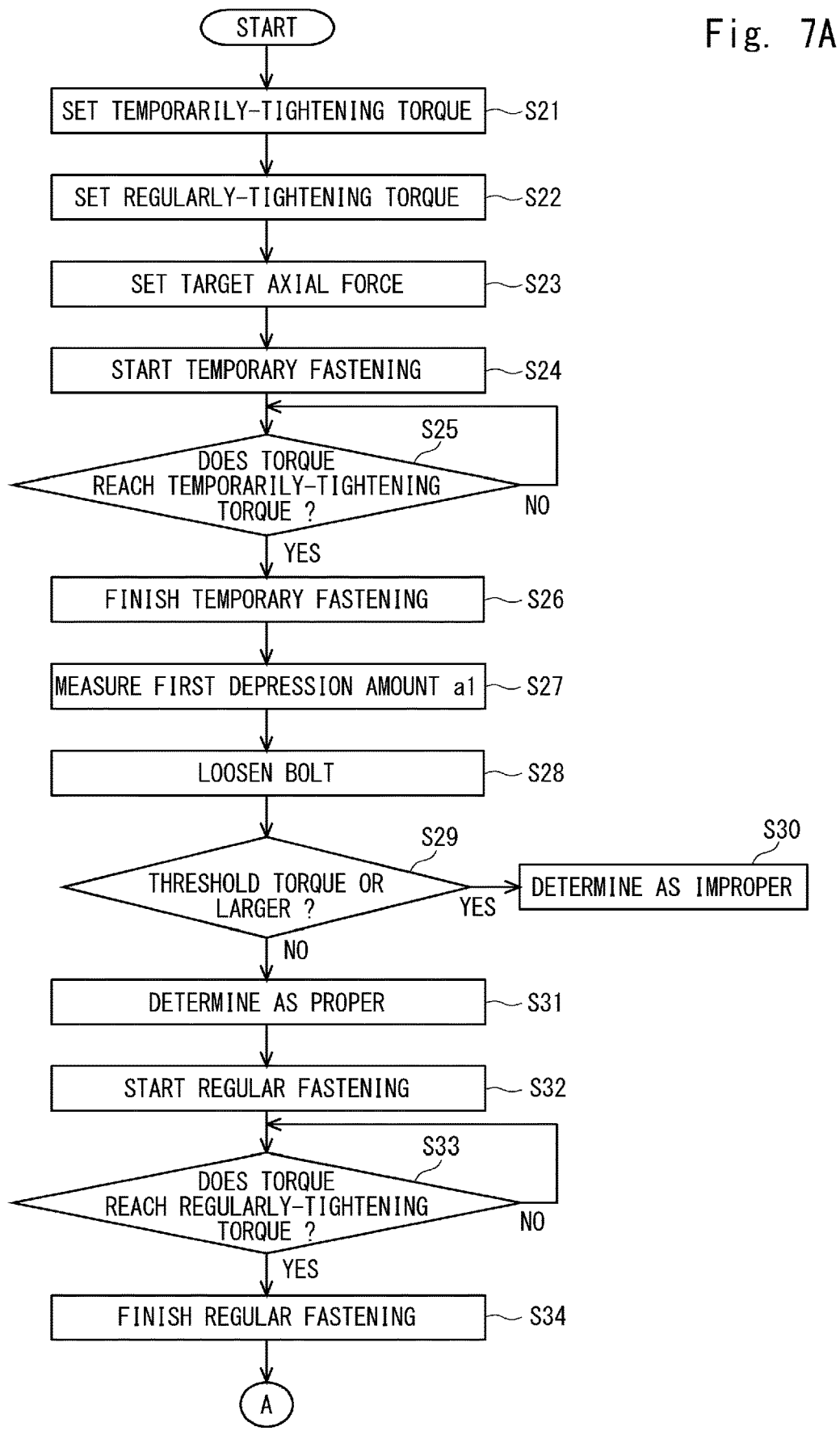
FIG. 7A is a flowchart showing a method for determining tightening of a bolt according to a second embodiment.
Figure 7B:
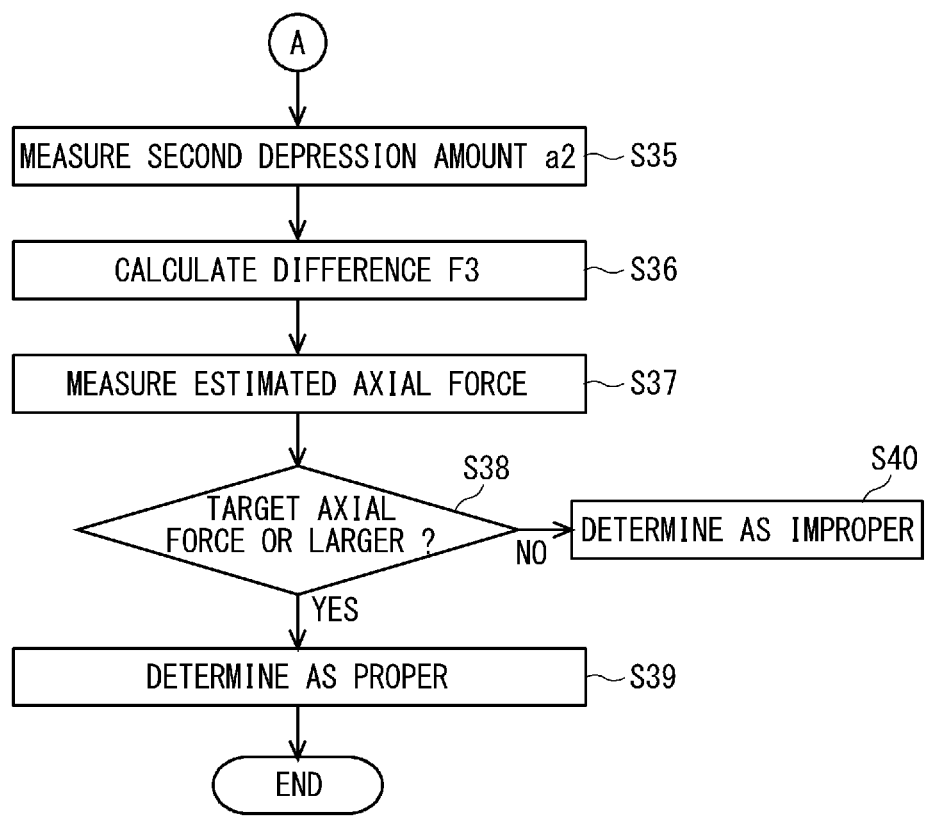
FIG. 7B is a flowchart showing the method for determining tightening of the bolt according to the second embodiment.

FIGS. 7A and 7B are flowcharts showing a method for determining tightening of a bolt according to this embodiment. Note that processes in steps S21 to S27 in the tightening determination method according to this embodiment correspond to those in the steps S1 to S7 in the tightening determination method according to the first embodiment. Further, processed in steps S32 to S40 in the tightening determination method according to this embodiment correspond to those in the steps S8 to S16 in the tightening determination method according to the first embodiment.

That is, in the tightening determination method according to this embodiment, the tightening determination apparatus loosens the bolt 90 after the process in the step S27 (S28). Specifically, when the range finder controller 140 measures a first depression amount a1, it outputs a measurement completion signal to the manipulator controller 160. Upon receiving the measurement completion signal, the manipulator controller 160 retracts the range finder 14 from the position where the range finder 14 is opposed to the head 90a of the bolt 90. Then, the manipulator controller 160 controls the manipulator 16 so that the manipulator 16 moves the socket part 12a of the fastening machine 12 so that the socket part 12a is opposed to the head portion 90a of the bolt 90, and lowers the socket part 12*a* so that the head 90*a* is inserted into the socket part 12*a*.

When the bolt 90 is set in the state where its head 90*a* is inserted into the socket part 12*a* of the fastening machine 12, the manipulator controller 160 outputs a setting completion signal to the fastening machine controller 120.

Upon receiving the set completion signal, the fastening machine controller 120 controls the fastening machine 12 so that the bolt 90 is loosened to a set rotation angle. When the rotation angle of the bolt 90 reaches the set rotation angle, the fastening machine controller 120 stops the fastening machine 12 and thereby finishes the loosening operation.

Next, the tightening determination apparatus determines whether or not a loosening torque with which the bolt 90 is loosened is equal to or larger than a set threshold torque (S29). Specifically, for example, the fastening machine 12 is equipped with a torque sensor and outputs a signal indicating the loosening torque with which the bolt 90 is loosened to the fastening machine controller 120. Then, when the loosening operation is finished, the fastening machine controller 120 determines whether or not the loosening torque indicated by the input signal, i.e., the loosening torque with which the bolt 90 is loosened is equal to or larger than the set threshold torque.

It should be noted that when the bolt 90 is not properly fastened to (i.e., not properly screwed into) the fastened component 80, burning occurs in the bolts 90. As a result, a loosening torque larger than the torque that is required when the bolt 90 is properly fastened to the fastened component 80 is required in order to loosen the bolt 90 from the fastened component 80.

Therefore, in this embodiment, when the loosening torque indicated by the input signal, i.e., the loosening torque with which the bolt 90 is loosened is equal to or larger than the set threshold torque (Yes at S29), the fastening machine controller 120 determines that the bolt 90 is not properly fastened to the fastened component 80 (S30).

On the other hand, when the loosening torque indicated by the input signal, i.e., the loosening torque with which the bolt 90 is loosened is smaller than the set threshold torque (No at S29), the fastening machine controller 120 determines that the bolt 90 is properly fastened to the fastened component 80 (S31) and moves to the process in the step S32.

Since the tightening determination apparatus and the tightening determination method according to this embodiment determine whether or not the bolt 90 is properly fastened to the fastened component 80 as described above, they can prevent the bolt 90 from being improperly fastened to the fastened component 80.

Third Embodiment

In the first and second embodiments, as an example of the bolt 90, a solid hexagonal-head bolt is fastened to a fastened component 80. However, a hexagonal-head bolt including a hollow shaft can also be fastened to a fastened component in a similar manner. Note that the tightening determination apparatus according to this embodiment has roughly the same configuration as that of the tightening determination apparatus according to the first embodiment. Therefore, duplicate descriptions and drawings are omitted and the same symbols are assigned to the same components/structures.

Figure 8:
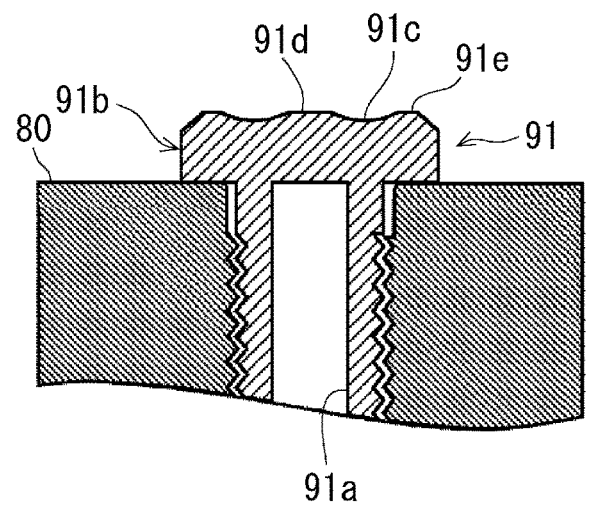
FIG. 8 is a cross section showing a bolt fastened to a fastened component.
Figure 9:
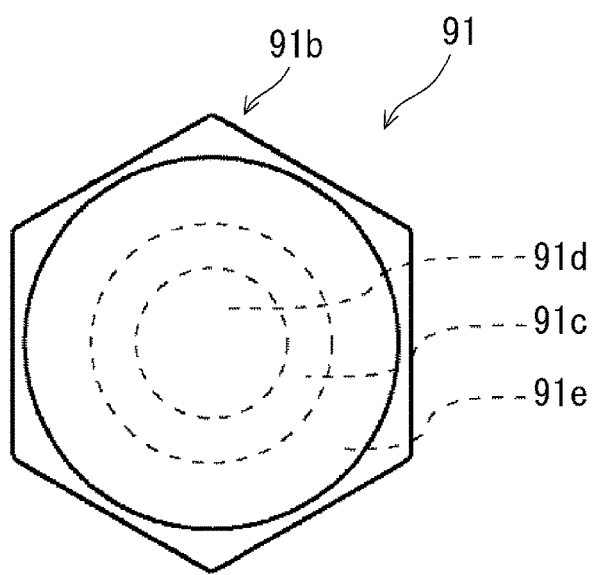
FIG. 9 is a plan view showing the bolt fastened to the fastened component.

Note that FIG. 8 is a cross section showing a bolt fastened to a fastened component. FIG. 9 is a plan view showing the bolt fastened to the fastened component. When a bolt 91 is fastened to a fastened component, an axial force is generated in the bolt 91 so that the bolt 91 contracts in an axial direction. Therefore, a head 91*b* of the bolt 91 receives a force in a direction in which the head 91*b* is pulled by a shaft 91*a* of the bolt 91.

In this state, since an annular part 91*c*, which is located on an extended line of the shaft 91*a*, receives a largest axial force in the head 91*b*, the annular part 91*c* is depressed more than a central part 91*d* and a fringe part 91*e* are. The larger the axial force of the bolt 91 is, the more the annular part 91*c* is depressed relative to the other parts. Therefore, it is possible to measure the axial force of the bolt 91 by measuring a value that is obtained by subtracting a height of the most depressed area in the annular part 91*c* from a height of the least depressed area in the central part 91*d*, i.e., by measuring a depression amount on the head 91*b*.

Therefore, in this embodiment, each of the axial force of the temporarily-fastened bolt 91 and the axial force of the regularly-fastened bolt 91 is measured by using a value (a depression amount) that is obtained by subtracting a height of the most depressed area in the annular part 91*c* from a height of the least depressed area in the central part 91*d*.

Figure 10:
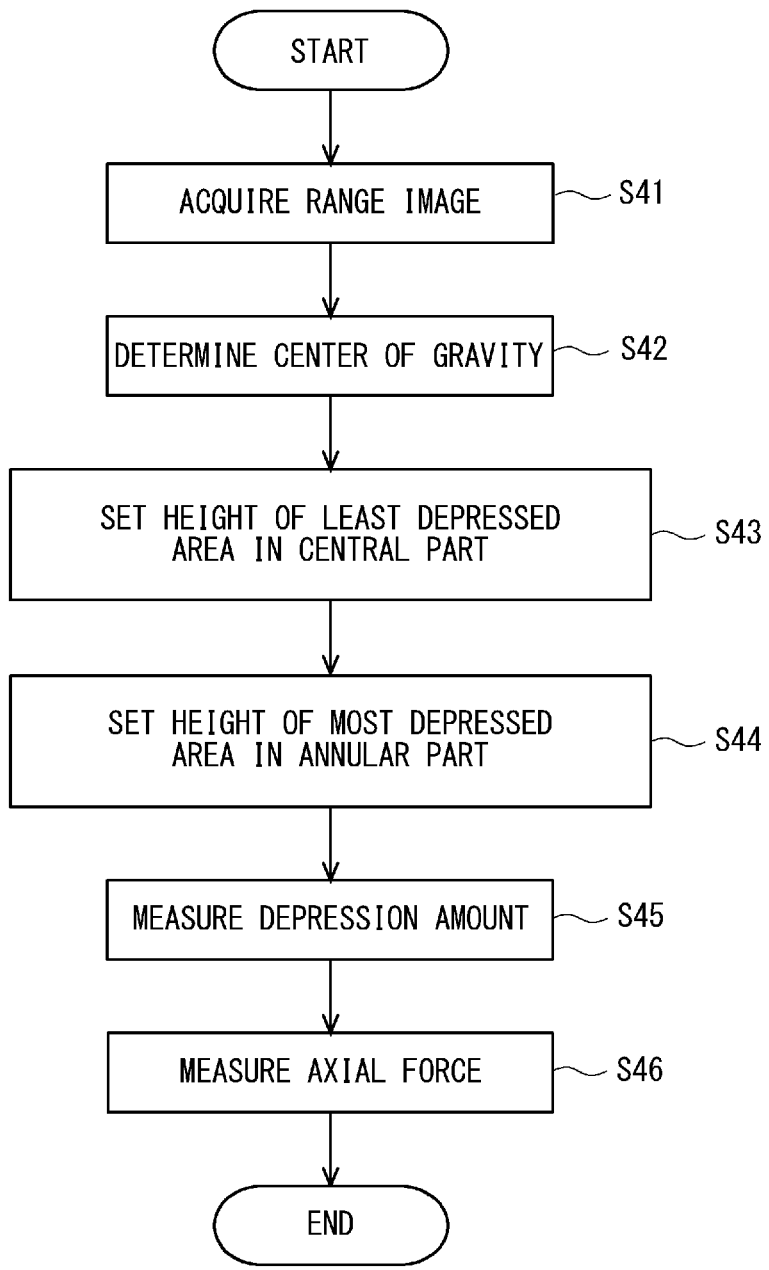
FIG. 10 is a flowchart showing a method for measuring an axial-force of a bolt performed in a tightening determination method for a bolt according to a third embodiment.
Figure 11:
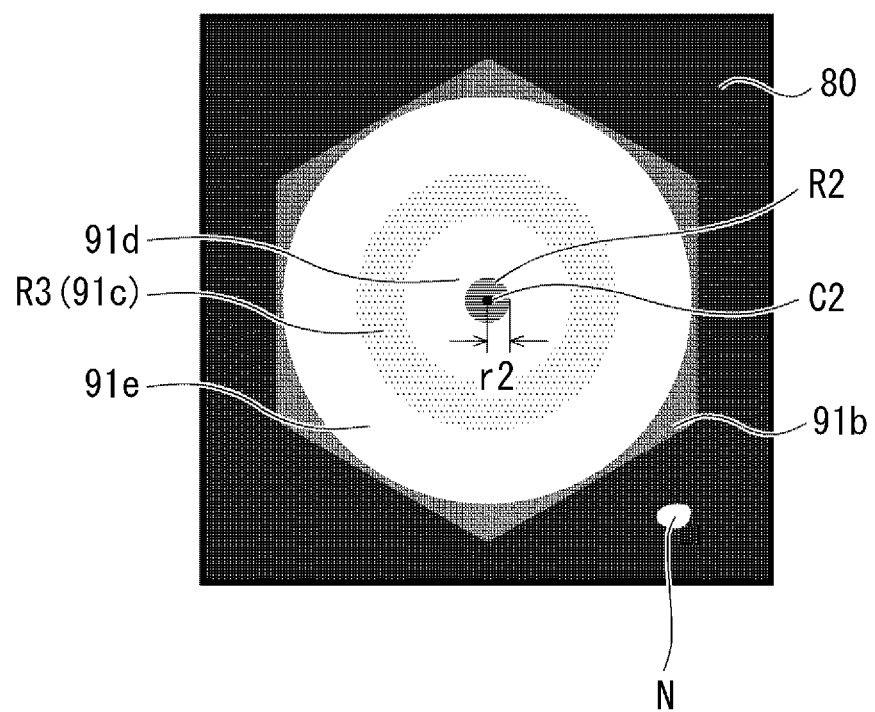
FIG. 11 is a drawing for explaining a procedure for calculating a depression amount on a head of a bolt by using a range image.

A method for measuring an axial-force of a bolt 91 performed within a tightening determination method according to this embodiment is described hereinafter. FIG. 10 is a flowchart showing a method for measuring an axial-force of a bolt performed in a tightening determination method for a bolt according to this embodiment. FIG. 11 is a drawing for explaining a procedure for calculating a depression amount on a head of a bolt by using a range image.

Firstly, similarly to the first embodiment, the range finder controller 140 acquires a range image (S41), extracts a head 91*b* of a bolt 91 by performing binarization processing, labeling processing, etc. for the acquired range image, eliminates noises N caused by dust and the like, and calculates a center of gravity C2 of the head 91*b* of the bolt 91 (S42).

Next, the range finder controller 140 calculates an average value of heights of a circular area R2 that is centered on the center of gravity C2 of the head 91*b* of the bolt 91 and has a radius r2. Note that the circular area R2 is disposed inside the central part 91*d* and the range finder controller 140 defines the calculated average value as a height of the least depressed area in the central part 91*d* (S43).

Next, the range finder controller 140 repeats a process of calculating an average value of heights of an annular area R3 that surrounds the circular area R2 and has a difference between a predetermined inner diameter and an predetermined outer diameter as its width, while changing the inner diameter and the outer diameter of the annular area R3 by a predetermined value at a time.

That is, the range finder controller 140 scans (i.e., shifts) the annular area R3 radially from the center of gravity C2. Note that the annular area R3 is disposed inside the annular part 91*c* and the range finder controller 140 defines the average value of the annular area R3 having the smallest average value of heights as a height of the most depressed area in the annular part 91*c* (S44).

Next, the range finder controller 140 measures a depression amount on the head 91*b* by subtracting a height of the most depressed area in the annular part 91*c* from a height of the least depressed area in the central part 91*d* (S45).

Next, the range finder controller 140 measures an axial force of the bolt 91 by using the depression amount on the head 91*b* and an axial-force conversion curve (S46). Through the above-described procedure, similarly to the first and second embodiments, it is possible to carry out a method for determining tightening of a bolt 91 by measuring an axial force of the temporarily-fastened bolt 91 and an axial force of the regularly-fastened bolt 91.

In this way, it is possible to measure, when a bolt 91 having a hollow shaft 91a is fastened to a fastened component 80, an axial force of the bolt 91, in addition to measuring a bolt 90 having a solid shaft 90b. Further, it is possible to determine whether or not the bolt 91 having the hollow shaft 91a is properly fastened to the fastened component 80.

The present disclosure is not limited to the above-described embodiments and various modifications can be made without departing the spirit and scope of the present disclosure.

In the above-described first to third embodiments, an axial force of a temporarily-fastened bolt and an axial force of a regularly-fastened bolt are measured by using depression amounts on the head of the bolt and an axial-force conversion curve. However, the present disclosure is not limited to such measurements. For example, there is a correlation between amounts of elongation of a bolt and axial forces of the bolt. Therefore, an axial force of a temporarily-fastened bolt and/or an axial force of a regularly-fastened bolt may be measured by measuring an amount of elongation of the bolt fastened to a fastened component by using ultrasonic waves or the like, and using the measured amount of elongation and a predetermined correlation between amounts of elongation of the bolt and axial forces of the bolt. Further, an axial force of a temporarily-fastened bolt and/or an axial force of a regularly-fastened bolt may be measured by using an electromagnetic eddy-current type axial-force meter for a bolt. The electromagnetic eddy-current type axial-force meter for a bolt uses a characteristic that as a bolt is fastened to a fastened component and hence its axial force increases, a compressive stress occurs in the head of the bolt and, as a result, a magnetic permeability of the head of the bolt decreases. In short, the method for measuring an axial force of a temporarily-fastened bolt and an axial force of a regularly-fastened bolt is not limited to any particular measurement methods.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A method for measuring an axial-force of a bolt fastened to a component to be fastened, comprising:
   temporarily fastening the bolt to the component to be fastened with a temporarily-tightening torque, the temporarily-tightening torque being a torque which is determined in advance and by which a depression is formed on a head of the bolt;
   measuring a first axial force of the temporarily-fastened bolt;
   regularly fastening the bolt to the component to be fastened with a regularly-tightening torque, the regularly-tightening torque being torque which is determined in advance and larger than the temporarily-tightening torque;
   measuring a second axial force of the regularly-fastened bolt; and
   measuring an estimated axial force of the regularly-fastened bolt by using the torque with which the bolt is temporarily fastened, the torque with which the bolt is regularly fastened, and a difference between the first and second axial forces, wherein
   the measuring of the first axial force comprises:
   acquiring a first image representing a height distribution on the head of the temporarily-fastened bolt;
   measuring a first depression amount on the head of the temporarily-fastened bolt by using the first image; and
   measuring the first axial force by using the first depression amount and a predetermined correlation between axial forces of the bolt and depression amounts on the head of the bolt,
   the measuring of the second axial force comprises:
   acquiring a second image representing a height distribution on the head of the regularly-fastened bolt;
   measuring a second depression amount on the head of the regularly-fastened bolt by using the second image; and
   measuring the second axial force by using the second depression amount and the predetermined correlation between axial forces of the bolt and depression amounts on the head of the bolt, and
   the estimated axial force of the regularly-fastened bolt is derived from Expression (1):

$$F = f2 \times t2/(t2-t1) \quad \text{(Expression 1)}$$

where F denotes an estimated axial force of the regularly-fastened bolt, f2 denotes a difference between the first and second axial forces, t1 denotes a torque with which the bolt is temporarily fastened, and t2 denotes a torque with which the bolt is regularly fastened.

2. A tightening determination apparatus for a bolt fastened to a component to be fastened, comprising:
   a fastening unit configured to fasten the bolt to the component to be fastened;
   a measurement unit configured to measure an axial force of the bolt; and
   a determination unit configured to determine whether or not the bolt is properly fastened to the component to be fastened, wherein
   the measurement unit is further configured to:
   measure a first axial force of the bolt temporarily fastened to the component to be fastened with a temporarily-tightening torque, the temporarily-tightening torque being a torque which is determined in advance and by which a depression is formed on a head of the bolt, by acquiring a first image representing a height distribution on the head of the temporarily-fastened bolt, measuring a first depression amount on the head of the temporarily-fastened bolt by using the first image, and using the first depression amount and a predetermined correlation between axial forces of the bolt and depression amounts on the head of the bolt;
   measure a second axial force of the bolt regularly-fastened to the component to be fastened with a regularly-tightening torque, the regularly-tightening torque being torque which is determined in advance and larger than the temporarily-tightening torque, by acquiring a second image representing a height distribution on the head of the regularly-fastened bolt, measuring a second depression amount on the head of the regularly-fastened bolt by using the second image, and using the second depression amount and a predetermined correlation between axial forces of the bolt and depression amounts on the head of the bolt; and
   measure an estimated axial force of the regularly-fastened bolt by using the torque with which the bolt is temporarily fastened, the torque with which the bolt is regularly fastened, and a difference between the first and second axial forces as shown in Expression 1:

$$F=f2\times t2/(t2-t1) \qquad \text{(Expression 1)}$$

where F denotes an estimated axial force of the regularly-fastened bolt, f2 denotes a difference between the first and second axial forces, t1 denotes a torque with which the bolt is temporarily fastened, and t2 denotes a torque with which the bolt is regularly fastened, and the determination unit is further configured to determine whether or not an estimated axial force of the regularly-fastened bolt is equal to or larger than a predetermined target axial force, and determine that the regularly-fastened bolt is properly fastened to the component to be fastened when the estimated axial force of the bolt is equal to or larger than the predetermined target axial force.

3. The method for measuring the axial force of the bolt according to claim 1, wherein the bolt is a bolt including a solid shaft, and each of the first and second depression amounts is a value that is obtained by subtracting an average value of a height distribution in a circular area centered on a center of gravity of the head of the bolt from an average value of a height distribution in a fringe part on the head of the bolt.

4. The method for measuring the axial force of the bolt according to claim 1, wherein the bolt is a bolt including a hollow shaft, and each of the first and second depression amounts is a value that is obtained by subtracting an average value of a height distribution in an annular area on the head of the bolt from an average value of a height distribution in a circular area on the head of the bolt, the circular area being centered on a center of gravity of the head of the bolt, the annular area surrounding the circular area and being located on an extended line of the shaft.

5. A method for determining tightening of a bolt fastened to a component to be fastened, comprising:

temporarily fastening the bolt to the component to be fastened with a temporarily-tightening torque, the temporarily-tightening torque being a torque which is determined in advance and by which a depression is formed on a head of the bolt;

measuring a first axial force of the temporarily-fastened bolt;

regularly fastening the bolt to the component to be fastened with a regularly-tightening torque, the regularly-tightening torque being torque which is determined in advance and larger than the temporarily-tightening torque;

measuring a second axial force of the regularly-fastened bolt;

measuring an estimated axial force of the regularly-fastened bolt by using the torque with which the bolt is temporarily fastened, the torque with which the bolt is regularly fastened, and a difference between the first and second axial forces; and determining that the regularly-fastened bolt is properly fastened to the component to be fastened when the estimated axial force of the regularly-fastened bolt is equal to or larger than a predetermined target axial force, wherein the measuring of the first axial force comprises:

acquiring a first image representing a height distribution on the head of the temporarily-fastened bolt;

measuring a first depression amount on the head of the temporarily-fastened bolt by using the first image; and measuring the first axial force by using the first depression amount and a predetermined correlation between axial forces of the bolt and depression amounts on the head of the bolt, the measuring of the second axial force comprises:

acquiring a second image representing a height distribution on the head of the regularly-fastened bolt;

measuring a second depression amount on the head of the regularly-fastened bolt by using the second image; and measuring the second axial force by using the second depression amount and the predetermined correlation between axial forces of the bolt and depression amounts on the head of the bolt, and the estimated axial force of the regularly-fastened bolt is derived from Expression (1):

$$F=f2\times t2/(t2-t1) \qquad \text{(Expression 1)}$$

where F denotes an estimated axial force of the regularly-fastened bolt, f2 denotes a difference between the first and second axial forces, t1 denotes a torque with which the bolt is temporarily fastened, and t2 denotes a torque with which the bolt is regularly fastened.

6. The method for determining the tightening of the bolt according to claim 5, further comprising:

loosening, after measuring the first axial force of the temporarily-fastened bolt, the bolt and measuring a torque required to loosen the bolt; and determining that the bolt is not properly fastened to the component to be fastened when the torque required to loosen the bolt is equal to or larger than a predetermined torque.

7. An axial-force measurement apparatus for a bolt fastened to a component to be fastened, comprising:

a fastening unit configured to fasten the bolt to the component to be fastened; and a measurement unit configured to measure an axial force of the bolt, wherein the measurement unit is further configured to:

measure a first axial force of the bolt temporarily fastened to the component to be fastened with a temporarily-tightening torque, the temporarily-tightening torque being a torque which is determined in advance and by which a depression is formed on a head of the bolt, by acquiring a first image representing a height distribution on the head of the temporarily-fastened bolt, measuring a first depression amount on the head of the temporarily-fastened bolt by using the first image, and using the first depression amount and a predetermined correlation between axial forces of the bolt and depression amounts on the head of the bolt;

measure a second axial force of the bolt regularly-fastened to the component to be fastened with a regularly-tightening torque, the regularly-tightening torque being torque which is determined in advance and larger than the temporarily-tightening torque, by acquiring a second image representing a height distribution on the head of the regularly-fastened bolt, measuring a second depression amount on the head of the regularly-fastened bolt by using the second image, and using the second depression amount and a predetermined correlation between axial forces of the bolt and depression amounts on the head of the bolt; and measure an estimated axial force of the regularly-fastened bolt by using the torque with which the bolt is temporarily fastened, the torque with which the bolt is regularly fastened, and a difference between the first and second axial forces as shown in Expression 1:

$$F = f2 \times t2/(t2-t1) \qquad \text{(Expression 1)}$$

where F denotes an estimated axial force of the regularly-fastened bolt, f2 denotes a difference between the first and second axial forces, t1 denotes a torque with which the bolt is temporarily fastened, and t2 denotes a torque with which the bolt is regularly fastened.

* * * * *